United States Patent
Tsuchiya et al.

(10) Patent No.: US 12,441,913 B2
(45) Date of Patent: Oct. 14, 2025

(54) CROSSLINKING ADHESIVE COMPOSITION AND ADHESIVE TAPE

(71) Applicant: TERAOKA SEISAKUSHO CO., LTD., Shinagawa-ku (JP)

(72) Inventors: Yasushi Tsuchiya, Shinagawa-ku (JP); Miho Sampei, Shinagawa-ku (JP)

(73) Assignee: TERAOKA SEISAKUSHO CO., LTD., Shinagawa-ku (JP)

(*) Notice: Subject to any disclaimer, the term of this patent is extended or adjusted under 35 U.S.C. 154(b) by 588 days.

(21) Appl. No.: 17/995,288

(22) PCT Filed: Feb. 2, 2021

(86) PCT No.: PCT/JP2021/003734
§ 371 (c)(1),
(2) Date: Sep. 30, 2022

(87) PCT Pub. No.: WO2021/199650
PCT Pub. Date: Oct. 7, 2021

(65) Prior Publication Data
US 2023/0159793 A1    May 25, 2023

(30) Foreign Application Priority Data
Mar. 31, 2020 (WO) .................. PCT/JP2020/014959

(51) Int. Cl.
| C08F 2/46 | (2006.01) |
| C08F 2/50 | (2006.01) |
| C08G 61/04 | (2006.01) |
| C09J 4/00 | (2006.01) |
| C09J 133/10 | (2006.01) |

(52) U.S. Cl.
CPC .............. *C09J 4/00* (2013.01); *C09J 133/10* (2013.01); *C09J 2203/326* (2013.01); *C09J 2301/312* (2020.08)

(58) Field of Classification Search
CPC ..... C09J 4/00; C09J 7/30; C09J 133/10; C09J 133/08; C09J 2203/326; C09J 2203/33; C09J 2301/312; Y02P 70/50; C08F 220/1804; C08F 220/1808; C08F 220/14; C08F 220/06; C08F 220/20; H01M 10/0525; Y02E 60/10
USPC .... 522/41, 40, 33, 6, 71, 1, 189, 184; 520/1
See application file for complete search history.

(56) References Cited

U.S. PATENT DOCUMENTS

| 2005/0090619 A1 | 4/2005 | Yoshimura et al. |
| 2018/0258327 A1 | 9/2018 | Tanaka et al. |
| 2019/0322911 A1* | 10/2019 | Takeya ........................ C09J 7/20 |

FOREIGN PATENT DOCUMENTS

| CN | 108699416 A | 10/2018 |
| CN | 110437755 A | 11/2019 |
| JP | 3-220280 A | 9/1991 |
| JP | 2003-201306 A | 7/2003 |
| JP | 2007-338 A | 1/2007 |
| JP | 2008-308670 A | 12/2008 |
| JP | 2016-176038 A | 10/2016 |
| JP | 2016-210863 A | 12/2016 |
| TW | 202000833 A | 1/2020 |
| WO | WO 2008/143010 A1 | 11/2008 |
| WO | WO 2014/002203 A1 | 1/2014 |
| WO | WO 2017/038383 A1 | 3/2017 |

OTHER PUBLICATIONS

International Search Report mailed on May 11, 2021 in PCT/JP2021/003734 filed on Feb. 2, 2021 (3 pages).
Combined Taiwanese Office Action and Search Report issued Mar. 6, 2024 in Taiwanese Patent Application No. 110111451 (with English translation), 11 pages.
Combined Chinese Office Action & Search Report issued Jul. 1, 2023 in Chinese Application 202180026642.7, (with English translation), 13 pages.
Extended European Search Report issued Apr. 16, 2024 in European Patent Application No. 21782309.5, 9 pages.

* cited by examiner

*Primary Examiner* — Jessica Whiteley
(74) *Attorney, Agent, or Firm* — Oblon, McClelland, Maier & Neustadt, L.L.P.

(57) ABSTRACT

A crosslinking adhesive composition containing an acrylic copolymer with 3 parts by mass or more and less than 25 parts by mass of component (A1), having two or more hydroxyl group-containing (meth)acrylate monomers, each of which has a defined molecular structure; 5 parts by mass or more and less than 25 parts by mass of component (A2) having a carboxylic acid group-containing (meth)acrylate monomer; 5 parts by mass or more and less than 30 parts by mass of component (A3) having a (meth)acrylic acid alkyl ester monomer with a defined molecular structure; and 50 parts by mass or more and less than 90 parts by mass of component (A4) having a (meth)acrylic acid alkyl ester monomer having a defined molecular structure, with respect to 100 parts by mass consisting of the sum of components (A1) to (A4).

9 Claims, No Drawings

CROSSLINKING ADHESIVE COMPOSITION AND ADHESIVE TAPE

CROSS REFERENCE TO RELATED APPLICATIONS

This application is a National Stage entry under 35 U.S.C. § 371 of PCT/JP2021/003734, filed on Feb. 2, 2021, which claims priority to PCT/JP2020/014959, filed on Mar. 31, 2020, the entire contents of which are incorporated herein by reference.

TECHNICAL FIELD

The present invention relates to a crosslinking adhesive composition and an adhesive tape, which enable to reduce the addition amount of a crosslinking component and which are usable for insulation and fixation, for example, in a battery, in particular, a non-aqueous battery such as a lithium-ion secondary battery.

BACKGROUND ART

In recent years, non-aqueous batteries such as lithium-ion secondary batteries, which phrase is also simply referred to as "a non-aqueous battery(ies)" hereafter, have been widely used in personal computers and smartphones.

Various adhesive tapes are used in non-aqueous batteries for closing terminals and protecting electrodes. Since such an adhesive tape is used in environments where it contacts an electrolytic solution, there is a case where components are eluted form the adhesive agent of the adhesive tape, which cause lowering the battery properties. Especially, additives such as a crosslinking agent contained in the adhesive agent may become a cause of lowering the battery properties. Therefore, battery manufactures require an adhesive tape using an adhesive agent, which contains reduced amounts of additives including a crosslinking agent.

In some cases, an adhesive agent dissolves and its adhesive force is lowered, and, consequently, its adhesive force necessary for closing terminals and protecting electrodes cannot be kept, also in contact with an electrolytic solution in the inside of a non-aqueous battery. When an adhesive tape peels off in the inside of a non-aqueous battery, it is possible to cause defects leading to short in the battery. Therefore, an adhesive tape is required to have a performance in order to maintain a constant adhesive force, although the adhesive tape contacts an electrolytic solution.

Further, when an adhesive tape is used for closing terminals and protecting electrodes in a non-aqueous battery, there is a possibility that tears occur in the adhesive tape by impurities or foreign substances of a separator or electrode burrs, which lead to battery short and the other troubles, i. e., malfunction will occur. Since higher safety has been required to the non-aqueous battery, an adhesive tape having a high piercing strength has been demanded, without tearing also in contact with the impurities or burrs in the inside of a non-aqueous battery.

Patent Document 1 discloses an adhesive tape to be sticked on a place which is immersed in an electrolytic solution or place which probably comes into contact with the electrolytic solution in the inside of a non-aqueous battery, wherein the adhesive tape is easily sticked on a battery constituent member at an ordinary temperature, and an excellent adhesive force of the adhesive tape can be kept in the inside environment of the non-aqueous battery.

However, although the adhesive agent of the adhesive tape disclosed in Patent Document 1 essentially contains an acrylic polymer and a polyisocyanate as a crosslinking agent, influences of the crosslinking component contained in the adhesive tape against a non-aqueous battery was not investigated.

In contrast, it becomes the problems to be solved to achieve a higher capacity, miniaturization and long-term use still more in the non-aqueous battery such as a lithium-ion secondary battery. As a result, although the influences of trace components such as reaction residue of a crosslinking agent have not considered to be problematic up to now, such influences will relatively increase. Thus, an adhesive tape having a reduced content of the crosslinking component is now required.

Patent Document 2 discloses an adhesive tape for a battery usable in a non-aqueous battery capable of preventing penetration of projections such as impurities or burrs into a separator and stripping off an active material, and of improving insertion competence of electrodes into a battery case, without causing lowering the battery properties.

Patent Document 2 discloses that a crosslinking agent may be added to the adhesive layer as required.

However, Patent Document 2 does not touch the influence of the crosslinking component included in the adhesive tape to the non-aqueous battery, while the adhesive layers in the working examples verifying the effects of the invention contained the crosslinking agents as an essential component.

It is a general means to add the crosslinking component to the adhesive agent and the purpose of its addition is to improve and stabilize various properties by increasing the crosslink density and promoting hardening of the adhesive layer of the adhesive tape.

However, there was a case where flexibility of an adhesive layer was reduced, and its adhesive property was degraded, when the crosslinking agent was added, in comparison with the case where no crosslinking agent was added.

PRIOR ART DOCUMENT

Patent Document

Patent Document 1: WO 2013/133167
Patent Document 2: Japanese patent Laid-open No. 2013-140765, JP2013140765(A)

SUMMARY OF THE INVENTION

Problem to be Solved by the Invention

The object of the present invention is to provide a crosslinking adhesive composition enabling to suppress the content of the crosslinking component, and an adhesive tape comprising an adhesive layer including the crosslinking adhesive composition, which can be suitably used for insulation and fixing, for example, in a battery, in particular a non-aqueous batter such as a lithium-ion secondary battery.

MODES FOR CARRYING OUT THE INVENTION

A crosslinking adhesive composition comprising an acrylic copolymer according to the present invention, which comprises:
  3 parts by mass or more than 3 parts by mass, and less than 25 parts by mass of component (A1) consisting of a hydroxyl group-containing (meth)acrylate monomer represented by chemical formula (1) and a hydroxyl group-containing (meth)acrylate monomer represented by chemical formula (2), 5 parts by mass or more than 5 parts by mass and less than 25 parts by mass of component (A2) consisting of a carboxylic acid group-containing (meth)acrylate monomer, 5 parts by mass or more than 5 parts by mass and less than 30 parts by mass of component (A3) consisting of a (meth)acrylic acid alkyl ester monomer represented by chemical formula (3), and 50 parts by mass or more than 50 parts by mass and less than 90 parts by mass of component (A4) consisting of a (meth)acrylic acid alkyl ester monomer represented by chemical formula (4), based on 100 parts by mass consisting of the sum of components (A1) to (A4).

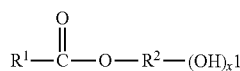
(1)

[In chemical formula (1), $R^1$ represents $CH_2=CH-$ or $CH_2=C(CH_3)-$, and $R^2$ represents a hydrocarbon group or an oxygen atom-containing hydrocarbon group, and $x^1$ is an integer of 1 to 3.]

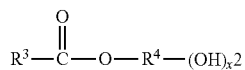
(2)

[In chemical formula (2), $R^3$ represents $CH_2=CH-$ or $CH_2=C(CH_3)-$, and $R^4$ represents a hydrocarbon group or an oxygen atom-containing hydrocarbon group, wherein the number of carbon atoms of $R^4$ is greater than that of $R^2$ in chemical formula (1), and $x^2$ is an integer of 1 to 3.]

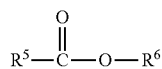
(3)

[In chemical formula (3), $R^5$ represents $CH_2=CH-$ or $CH_2=C(CH_3)-$, $R^6$ represents an alkyl group having 1 to 3 carbon atoms, a cyclohexyl group or an isobornyl group.]

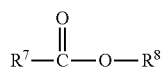
(4)

[In chemical formula (4), $R^7$ represents $CH_2=CH-$ or $CH_2=C(CH_3)-$, $R^8$ represents an alkyl group having 4 to 12 carbon atoms.]

The crosslinking adhesive composition according to the present invention is preferably a self-crosslinking type, which does not contain any crosslinking agent(s), i. e., contains no crosslinking agent(s).

The crosslinking adhesive composition according to the present invention may contain a crosslinking agent in an amount of 0.5 parts by mass or less, as solid content, with relative to, i. e., per 100 parts by mass of the acrylic copolymer.

An adhesive tape according to the present invention comprises an adhesive layer, which comprises the above crosslinking adhesive composition.

The adhesive tape according to the present invention may comprise a structure having the adhesive layer is formed on a base material. The base material is preferably at least one of a polyethylene terephthalate (PET) film, a biaxially oriented polypropylene (OPP) film, and a polyimide (PI) film, a polyphenylene sulfide (PPS) film.

The thickness of the adhesive layer of the adhesive tape according to the present invention is preferably 1 to 200 μm.

The adhesive tape according to the present invention preferably has an adhesive force retention rate of 45% or more than 45% after immersion in an electrolytic solution, which is calculated by the following calculation formula:

$$X=[(B)/(A)]\times 100[\%]$$

[X: Adhesive force retention rate after immersion in an electrolytic solution, (A): Adhesive force before immersion in the electrolytic solution measured by the method described in Japanese Industrial Standards (JIS)-Z-0237:2000, and (B) Adhesive force after immersion in the electrolytic solution measured by the method described in Japanese Industrial Standards (JIS)-Z-0237:2000]

The adhesive tape according to the present invention is especially useful for the uses under the conditions of contacting an electrolytic solution of a non-aqueous battery.

Effect of the Invention

Since the addition amount of a crosslinking component, i. e., a crosslinking agent-containing component, can be suppressed in an adhesive tape according to the present invention, deterioration of battery performance can be suppressed, when the adhesive tape is used in a battery, in particular a non-aqueous battery such as a lithium-ion secondary battery.

In addition, the adhesive tape according to the present invention is excellent in adhesive performance to an adherend such as a separator and an electrode in the inside of a non-aqueous battery. When the adhesive tape is used in an environment in contact with an electrolytic solution in the inside of the non-aqueous battery, the adhesive tape according to the present invention is also excellent in its adhesive force retention performance.

Further, when the adhesive tape is used for closing terminals or protection of electrodes, brakes or tears in the adhesive tape caused by impurities existing in a separator or electrode burrs can be suppressed according to the present invention.

Therefore, the adhesive tape according to the present invention can be preferably used for insulation and fixing in a battery, in particular a non-aqueous battery such as a lithium-ion secondary battery.

MODES FOR CARRYING OUT THE INVENTION

<Acrylic Copolymer>

According to the present invention, a resin component of a crosslinking adhesive composition, i. e., an adhesive composition of a crosslinking type, comprises an acrylic copolymer, which comprises the following components (A1) to (A4) as the constituent components forming the polymer chains:

(A1): A component consists of a hydroxyl group-containing (meth)acrylate monomer(s) represented by the above-described chemical formula (1) [referred to as component (A1a)] and a hydroxyl group-containing (meth)acrylate monomer(s) represented by the above-described chemical formula (2) [referred to as component (A1b)]: 3 parts by mass or more than 3 parts by mass and less than 25 parts by mass;

(A2): A component consists of a carboxylic acid group-containing (meth)acrylic monomer(s): 5 parts by mass or more than 5 parts by mass and less than 25 parts by mass;

(A3): A component consists of (meth)acrylic acid alkyl ester monomer(s) represented by the above-described chemical formula (3): 5 parts by mass or more than 5 parts by mass and less than 30 parts by mass; and (A4): A component consists of (meth)acrylic acid alkyl ester monomer(s) represented by the above-described chemical formula (4): 50 parts by mass or more than 50 parts by mass and less than 90 parts by mass.

[The Sum of the Above Components is Taken as 100 Parts by Mass.]

As component (A1a), either one of the hydroxyl group-containing (meth)acrylate monomers represented by chemical formula (1) or a combination of two or more thereof can be used.

As component (A1b), either one of the hydroxyl group-containing (meth)acrylate monomers represented by chemical formula (2) or a combination of two or more thereof can be used.

The monomer composition to form the acrylic copolymer contained in the resin component in the crosslinking adhesive composition according to the present invention preferably consists of components (A1) to (A4).

The term "(meth)acryl" is a generic term including both of "acryl" and "methacryl".

$R^2$ and $R^4$, independently each other, may be a hydrocarbon group or an oxygen atom-containing hydrocarbon group, which are not limited, particularly. These groups may be either saturate or non-saturate, and saturate hydrocarbon groups and oxygen atom-containing saturate hydrocarbon group are preferable. These groups may be ether aliphatic or aromatic, and aliphatic hydrocarbon groups and oxygen atom-containing aliphatic hydrocarbon groups are preferable. When they are aliphatic, the aliphatic groups may be linear, branched or alicyclic, and, further, linear or branched aliphatic hydrocarbon groups and oxygen atom-containing linear or branched aliphatic hydrocarbon groups are preferable. As these groups, linear aliphatic hydrocarbon groups and oxygen atom-containing linear aliphatic hydrocarbon groups are more preferable.

When $R^2$ and $R^4$ are a linear aliphatic hydrocarbon group and/or an oxygen atom-containing linear aliphatic hydrocarbon group, since crosslink density of the acrylic copolymer can be improved and dissolution of the adhesive agent into an electrolytic solution can be further suppressed.

As the concrete examples of each of $—R^2—(OH) x^1$ wherein $R^2$ is a hydrocarbon group in the above-described chemical formula (1) and $—R^4—(OH) x^2$ wherein $R^4$ is a hydrocarbon group in the above-described chemical formula (2), (i. e., hydrocarbon groups having hydroxyl groups), alkyl groups having a hydroxyl group(s) are preferable and alkyl groups having a hydroxyl group(s), which has 1 to 4 carbon atoms, are further preferable. Concrete examples thereof include hydroxyethyl group, hydroxypropyl group and hydroxybutyl group.

The concrete examples of each of $—R^2—(OH) x^1$ wherein $R^2$ is an oxygen atom-containing hydrocarbon group in the above-described chemical formula (1) and $—R^4—(OH) x^2$ wherein $R^4$ is an oxygen atom-containing hydrocarbon group in the above-described chemical formula (2), (i. e., oxygen atom-containing hydrocarbon groups having hydroxyl groups) include oxygen atom-containing saturate aliphatic hydrocarbon groups having a hydroxyl group(s), such as groups represented by $—(OR)_n—OH$ (for example, polyalkylene glycol groups such as polyethylene glycol groups, polypropylene glycol groups and polybutylene glycol groups), 2-(2-hydroxyethoxy)ethyl group, 2-hydroxy-3-methoxypropyl group and 2-hydroxy-3-butoxy propyl group.

At least one of $R^2$ and $R^4$ in the (meth)acrylate monomers represented by the above-described chemical formulae (1) and (2) in component (A1) is preferably a hydrocarbon group.

The number of carbon atom of $R^4$ in the above-described chemical formula (2) is larger than that of $R^2$ in the above-described chemical formula (1).

Concretely, for example, the carbon atom number difference between $R^2$ and $R^4$ is 1 or more than 1, preferably 2 or more than 2, further preferably 2 to 8, i. e., from 2 or more than 2, to 8 or less than 8. In particular, when the difference is 2 or more, more remarkable effect can be obtained, in respect of suppression of the adhesive agent dissolution by an electrolytic solution. It is deemed that entanglement of molecular chains becomes sufficient for the effect.

Therefore, it is preferable that the carbon atom number of $R^4$ in the above-described chemical formula (2) is appropriately large. However, when the number is too large, there is an unpreferable case where the proportion of the amount of hydroxyl group to the amount of $R^4$ may decrease.

Concretely, for example, the carbon atom number of $R^4$ in the above-described chemical formula (2) is 2 or more than 2, preferably 3 or more than 3, more preferably 4 to 12, i. e., from 4 or more than 4 to 12 or less than 12.

Concretely, for example, the carbon atom number of $R^2$ in the above-described chemical formula (1) is 1 or more than 1, preferably 1 to 4, i. e., from 1 or more than 1 to 4 or less than 4, more preferably 2 or 3.

The crosslink density of the acrylic copolymer can be improved and, thus, the dissolution of the adhesive agent by an electrolytic solution can be further suppressed when the carbon atom numbers of $R^2$ and $R^4$ in the above-described chemical formulae (1) and (2), respectively, are in the ranges as noted above.

$R^1$ and $R^3$ in the above-described chemical formulae (1) and (2), respectively, are, independently each other, $CH_2=CH—$ or $CH_2=C(CH_3)—$. $R^1$ in the above-described chemical formula (1) and $R^3$ in the above-described chemical formula (2) may be the same or different.

Each of $X^1$ and $X^2$ in the above-described chemical formulae (1) and (2), respectively, represents the number of hydroxyl group: $—(OH)$ connected to $R^2$ or $R^4$. $X^1$ and $X^2$ are, independently each other, an integer of 1 to 3, preferably 1 or 2, and the most preferred number thereof is 1. The polymerization can be stable and an adhesive agent having a desired adhesive force can be obtained, when $X^1$ and $X^2$ are in the above ranges.

$X^1$ and $X^2$ in the above-described chemical formulae (1) and (2), respectively, may be the same or different.

The bonding position(s) or site(s) of $—(OH)$ to $R^2$ and $R^4$ in the above-described chemical formulae (1) and (2), respectively, is not limited, especially. Regarding the bonding position or site of $—(OH)$ to $R^4$ in the above-described chemical formula (2), the bonding position or site is preferably on the molecular end side of $R^4$ (the opposite end side far from $R^3$). When the bonding position or site of $—(OH)$ to $R^4$ is located in the above area, the crosslink density of the acrylic copolymer can be improved and, thus, dissolution of the adhesive agent into an electrolytic solution can be further suppressed.

Specifically preferable concrete examples of the hydroxyl group containing (meth)acrylate monomers in the above-described chemical formulae (1) and (2), respectively, include (meth)acrylic acid hydroxyl alkyl esters such as (meth)acrylic add 2-hydroxyethyl [for example, acrylic acid 2-hydroxyethyl (2-HEA)], (meth)acrylic add 2-hydroxypropyl, (meth)acrylic acid 3-hydroxypropyl, (meth)acrylic acid 2-hydroxybutyl, (meth)acrylic acid 3-hydroxybutyl, (meth)acrylic acid 4-hydroxybutyl [for example, acrylic add 4-hydroxybutyl (4-HBA); polyalkylene glycol monoacrylates such as polyethylene glycol monoacrylates, polypropylene glycol monoacrylates. Component (A1) can be prepared by using at least two monomers as components (A1a) and (A1b) selected from the above monomers in combination. According to the combined use of at least two monomers in such a way as described above, the crosslink density of the acrylic copolymer can be improved and dissolution of the adhesive agent into an electrolytic solution can be further suppressed.

The content of component (A1) per the sum amount of all monomer components (A1) to (A4) taken as 100 parts by mass is 3 parts by mass or more than 3 parts by mass and less than 25 parts by mass. When this content is less than 3 parts by mass, crosslinked points are decrease and the adhesive agent dissolves by an electrolytic solution. As a result, the adhesive force after immersion in an electrolytic solution cannot be maintained. In contrast, when the above content is 25 parts by mass or more than 25 parts by mass, its normal adhesive force can decrease and, thus, the requirements concerning the adhesive force necessary to insulation or fixing in a non-aqueous battery cannot be satisfied.

The content of component (A1) is preferably 3 to 23 parts by mass, i. e., from 3 parts or more than 3 parts to 23 parts by mass or less than 23 parts by mass.

The ratio of the amount by mass (Ma) of component (A1a) and the amount by mass (Mb) of component (A1b) to form component (A1) may be set so as to achieve the effects desired by the present invention. In the combination of the defined amount of component (A2) in respect of maintenance of the resistant property against an electrolytic solution, for example, the adhesive force after immersion in an electrolytic solution, it is preferable either that Ma is the same as Mb, or that Ma is smaller than Mb, i. e., Ma=Mb or Ma<Mb. It is more preferable that Ma is smaller than Mb in the range of the double amount of Ma, i. e., Ma<Mb≤[2× Ma], and it is especially preferable that Ma: Mb is selected form the range of 1:1.2 to 1:2.

The carboxylic add group-containing (meth)acrylic monomer as component (A2) comprises a (meth)acrylic group and a carboxyl group. The usable examples thereof include (meth)acrylic acid [for example, acrylic acid (AA)], (meth)acrylic acid pi-carboxyethyl, itaconic acid, crotonic acid, maleic add, fumaric acid, citraconic acid, glutaconic acid, 2-acryloyloxyethyl succinate, 2-acryloyloxyethyl phthalate. Regarding these compounds, (meth)acrylic acid is preferably used, considering the crosslink density of the adhesive agent to be obtained and its easy availability. While one of the carboxylic acid group-containing (meth)acrylic monomers may be used, two or more thereof may be also used in combination.

The content of component (A2) per the sum of all monomers of components (A1) to (A4), which is taken as 100 parts by mass, is 5 parts or more than 5 parts by mass, and less than 25 parts by mass. When this content is less than 5 parts by mass, crosslinked points are decrease and the adhesive agent dissolves by an electrolytic solution. As a result, the adhesive force after immersion in an electrolytic solution cannot be maintained. In contrast, when the above content is 25 parts by mass or more than 25 parts by mass, its normal adhesive force can decrease and, thus, the requirements concerning the adhesive force necessary to insulation or fixing in a non-aqueous battery cannot be satisfied.

The content of component (A2) is preferably 10 to 23 parts by mass, i. e., from 10 parts by mass or more than 10 parts by mass to 23 parts by mass or less than 23 parts by mass.

As the (meth)acrylic add alkyl ester monomer represented by the above-described chemical formula (3) as component (A3), the examples thereof to be used include methyl acrylate (MA), ethyl acrylate, propyl acrylate, isopropyl acrylate, cyclohexyl (meth)acrylate, isobornyl (meth)acrylate. Regarding the crosslink density of the adhesive agent to be obtained, methyl acrylate is preferably used. While one of the (meth)acrylic acid alkyl ester monomers may be used, two or more than two thereof may be also used in combination.

The content of component (A3) per the sum of all monomers of components (A1) to (A4), which is taken as 100 parts by mass, is 5 parts or more than 5 parts by mass, and less than 30 parts by mass. When the content of component (A3) is less than 5 parts by mass, the adhesive agent cannot satisfy the adhesive force necessary for fixing the parts inside of an electric device or equipment, by reduction of repulsion resistance of the adhesive agent. In contrast, when the above content is 30 parts by mass or more than 25 parts by mass, its adhesive force may decrease and, thus, the requirements concerning the adhesive force necessary to insulation or fixing in a non-aqueous battery cannot be satisfied.

The content of component (A3) is preferably 5 to 25 parts by mass, i. e., from 5 parts by mass or more than 5 parts by mass to 25 parts by mass or less than 25 parts by mass.

As the (met)acrylic acid alkyl ester monomers represented by the above-described chemical formula (4), the examples to be used includes butyl (meth)acrylate [for example, butyl acrylate (BA)], isobutyl (meth)acrylate, t-butyl (meth)acrylate, hexyl (meth)acrylate, isohexyl (meth)acrylate, octyl (meth)acrylate, isooctyl (meth)acrylate, 2-ethylhexyl (meth)arylate [for example, 2-ethyhexyl acrylate (2-EHA)], nonyl (meth)acrylate, isononyl (meth)acrylate, decyl (meth)acrylate, isodecyl (meth)acrylate, dodecyl (meth)acrylate, isododecyl (meth)acrylate, etc. The monomers including 2-ethyhexyl acrylate having a low glass transition point (Tg) are preferably used in order to maintain tackiness of the adhesive agent comprising the acrylic copolymer. While one of the (meth)acrylic acid alkyl ester monomers as component (A4) may be used, two or more than two thereof may be also used in combination.

The content of component (A4) per the sum of all monomers of components (A1) to (A4), which is taken as 100 parts by mass, 50 parts or more than 50 parts by mass, and less than 90 parts by mass. When the content of component (A4) is less than 50 parts by mass, since the normal adhesive force of the adhesive agent may decrease, and, thus, the requirements concerning the adhesive force necessary to insulation or fixing in a non-aqueous battery cannot be satisfied. When the content of component (A4) is 90 parts by mass or more than 90 parts by mass, the relative contents of the hydroxyl group-containing (meth)acrylate monomer(s) and the carboxylic acid group-containing monomer(s) are reduced, and, thus, crosslinked points decrease. As a result, the adhesive agent dissolves in an electrolytic solution and the adhesive force after immersion in an electrolytic solution cannot be maintained.

The content of component (A4) is preferably 50 to 80 parts by mass, i. e., from 50 parts by mass or more than 50 parts by mass to 80 parts by mass or less than 80 parts by mass.

The acrylic copolymer used for preparation of the crosslinking adhesive composition according to the present invention can be prepared by polymerizing the above monomers according to one of various polymerization methods such as a solution polymerization method, a bulk polymerization method, a suspension polymerization method and an emulsion polymerization method, etc. For example, an acrylic copolymer can be obtained by dissolving these monomers and a polymerization initiator in a liquid medium such as ethyl acetate or other solvents in a reaction vessel and stirring the reaction solution thus obtained for a defined time, under a constant temperature.

The weight-average molecular weight of the acrylic copolymer is not limited, especially. Its weight-average molecular weight may be controlled so that the adhesive force and the swelling degree become suitable for the environment where the adhesive tape according to the present invention is used. The weight-average molecular weights thereof are preferably 200,000 to 1,200,000, i. e., from 200,000 or more than 200,000 to 1,200,000 or less than 1,200,000; more preferably 250,000 to 1,000,000, i. e., from 250,000 or more than 250,000 to 1,000,000 or less than 1,000,000.

Since crosslinked structures can be formed between the carboxylic add groups and the hydroxylic groups by composing the above monomer composition, a crosslinking adhesive composition can be provided, which can reduce the addition amount of the crosslinking component. As a result, the retention rate of the adhesive force of the adhesive layer containing the adhesive agent after immersion in an electrolytic solution can be maintained in a sufficient level.

The crosslinking adhesive composition according to the present invention enables to improve the normal adhesive force by suppressing the addition amount of the crosslinking component. Since the normal adhesive force can be improved, sticking performance to an adherend such as separators and electrodes in the inside of a non-aqueous battery becomes excellent. As the reason why the normal adhesive force can be improved, it is deemed that the adhesive agent has self-crosslinked parts formed by crosslinking via the function groups, each other, in the acrylic copolymer, but not through any adhesive agent(s), and that the flexibility of the adhesive agent becomes relative higher and, thus, its wettability to the adherend can be improved.

The normal adhesive force of the adhesive agent obtained by crosslinking the adhesive composition of a crosslinking type according to the present invention can be set according to the desired uses of the adhesive agent. The normal adhesive force thereof may be preferably at least 1.0 N/10 mm.

Further, the crosslinking adhesive composition according to the present invention enables the adhesive layer to improve the piercing strength by suppressing the addition amount of the crosslinking component. Since the piercing strength can be improved, when the adhesive tape is used for closing terminals or protection of electrodes, brakes or tears in the adhesive tape caused by impurities existing in separators or projections such as electrode burrs can be suppressed.

As the reason why the piercing strength can be improved, it is deemed that the adhesive agent has self-crosslinked parts formed by crosslinking via the function groups, each other, in the acrylic copolymer, but not through any adhesive agent, and that the flexibility of the adhesive agent becomes relative higher and forces added to the adhesive layer are dispersed at the needle piercing.

The crosslinking adhesive composition according to the present invention preferably comprises at least self-crosslinking parts in a range, so as to obtain the effects desired by the present invention in the above-described cases where no crosslinking agent is added. Along this line, a crosslinking agent may be added to the crosslinking adhesive composition in a range so that the effects desired by the present invention cannot be defected. However, regarding the use in the place where no crosslinking agent is suitable, the crosslinking adhesive composition according to the present invention is preferably a self-crosslinking type containing no crosslinking agent.

From the viewpoint of preventing reduction of a normal adhesive force and securing a good resistance property against an electrolytic solution, the blending ratio of a crosslinking agent, as a solid content, to 100 parts by mass of the acrylic copolymer forming the crosslinking adhesive composition may be selected form the range of 0 to 0.5 parts by mass.

When the crosslinking adhesive composition according the present invention contains a crosslinking agent, the crosslinking agent can be added preferably in the blending ratio of 0.5 parts by mass or less than 0.5 parts, as a solid content, to 100 parts by mass of the acrylic copolymer contained in the crosslinking adhesive composition, i. e., the blending ratio is more than 0 parts by mass and 0.5 parts by mass or less than 0.5 parts by mass. The crosslinking agent can be added more preferably in the blending ration selected from the range of 0.001 to 0.5 parts by mass.

Examples of the crosslinking agent include glycidyl group-containing compounds, such as 1,3-bis(N,N'-diglycidylaminomethyl) cyclohexane, N,N,N',N'-tetraglycidyl-m-xylenediamine, N,N,N',N'-tetraglycidyl aminophenyl methane, triglycidyl isocyanurate, m-N,N-diglycidyl aminophenyl glycidyl ether, N,N-diglycidyl toluidine, N,N-diglycidyl aniline, pentaerythritol polyglycidyl ether, 1,6-hexythanediol diglycidyl ether, etc.; isocyanate group-containing compounds such as tolylene diisocyanate, xylene diisocyanate, chlorophenylene diisocyanate, hexamethylene diisocyanate, tetramethylene diisocyanate, isophorone diisocyanate, diphenylmethane diisocyanate, hydrogenated diphenylmethane diisocyanate, etc.

<Adhesive Tape>

The adhesive tape according to the present invention uses a crosslinking adhesive composition comprising the above-described acrylic copolymer as an adhesive agent, and an optional component(s) as required. The adhesive tapes defined by the above phrase "The adhesive tape according to the present invention uses a crosslinking adhesive composition comprising the above-described acrylic copolymer as an adhesive agent" include, for example, an adhesive tape consisting of an adhesive layer, per se, by forming the crosslinking adhesive composition in a sheet, i. e., the so-called "base-less type adhesive tape"; and an adhesive tape comprises an adhesive layer formed on one or both surfaces of a base material by using the crosslinking adhesive composition.

An adhesive tape of the baseless type can be formed, for example, by coating an acrylic copolymer on a substrate such as a release paper or other substrate and drying the coated layer, thereafter.

In contrast, an adhesive tape having a base material can be produced by coating the crosslinking adhesive composition according to the present invention and drying thereafter to form an adhesive layer. Alternatively, a crosslinking adhesive composition according to the present invention can be coated on a substrate such as a release paper or other substrate to form an adhesive layer and, then, the adhesive layer thus formed is transferred onto one or both surfaces of a base material to stick them together.

The adhesive layer in the baseless type adhesive tape and the base material-containing adhesive tape may be a single layer or a laminate by laminating two or more adhesive layers.

The thickness of the adhesive layer in the adhesive tape with a base material is preferably in the range of 1 μm to 200 μm, more preferably 5 μm to 100 μm. The thickness of the adhesive tape of the baseless type is preferably 1 μm to 200 μm, more preferably 5 μm to 100 μm.

The method of coating the crosslinking adhesive composition on a base material or on a substrate such as a release paper is not limited, especially, and any known methods can be used. Concrete examples thereof include the methods using roll coaters, die coaters, rip coaters, dip roll coaters, bar coaters, knife coaters, spray roll coaters, and other coaters.

As an index to evaluate the adhesive force of an adhesive tape suitable for the use in the parts contacting an electrolytic solution of a non-aqueous battery, the adhesive force retention rate after immersion in the electrolytic solution as a mixture solution of ethylene carbonate and diethyl carbonate in the volume ratio of 1:1 can be used, which is calculated by the following formula:

$$X=[(B)/(A)]\times 100[\%]$$

[X: Adhesive force retention rate after immersion in the electrolytic solution,
- (A): Adhesive force before immersion in the electrolytic solution measured by the method described in JIS-Z-0237:2000, and
- (B) Adhesive force after immersion in the electrolytic solution measured by the method described in JIS-Z-0237:2000]

As the adhesive force (A) before immersion in the electrolytic solution, its normal adhesive force can be also used. The method of calculating the adhesive force after immersion in the electrolytic solution will be explained later in detail.

An adhesive tape for a non-aqueous battery has preferably an adhesive force retention rate after immersion in the electrolytic solution of 45% or more than 45%, i.e., at least 45%.

Regarding that the adhesive tape has a base material, concrete examples of the base materials include fiber-based base materials such as paper, cloth, non-woven fabrics, nets, etc.; resin-based base materials (resin-based films or resin-based sheets) such as base materials made of olefin-based resin, polyester-based resin, polyvinyl chloride-based resin, vinyl acetate-based resin, polyamide-based resin, polyimide-based resin, polyetheretherketone (PEEK), polyphenylene sulfide (PPS), etc.; rubber sheets; foam sheets (foam base materials); metal foils; metal plates; etc.

Regarding the above base materials, at least one film selected form the group consisting of a polyethylene terephthalate (PET) film, a biaxially oriented polypropylene (OPP) film, a polyimide (PI) film and a polyphenylene sulfide (PPS) film may be preferably used from the viewpoints of their properties including versatility and chemical resistance against the electrolytic solution of a non-aqueous battery. In addition, the base materials may be also a laminate thereof, such as a laminate of a resin-based base material and a base material other than the resin-based base material and a laminate of resin-based base materials, each other.

The base materials may be a single layer, or a multilayer. The surface of the base material, on which an adhesive layer is formed, may be treated, if necessary, by various treatments, such as back-processing, antistatic treatment, under or primer coating treatment, corona treatment and plasma treatment.

The thickness of the base material is preferably 5 μm to 500 μm, more preferably 10 μm to 200 μm.

The adhesive tape can be protected by a release paper or other film. They are not limited, especially, and release papers and other films, which are publicly known, can be used as required.

EXAMPLES

Hereinafter, the present invention will be described in more detail with reference to the working examples and the comparative examples.

[Normal Adhesive Force (A)]

A single-sided adhesive tape sample having a width of 10 mm was sticked to a stainless steel (SUS 304) plate polished by a water-resistant sandpaper of No. 280 as an index of roughness, reciprocating a 2.0 kg roller one time under pressure. After 20 minutes form the pressure sticking, 180° peel adhesion (N/10 mm width) of this sample was measured according to the method described in JIS Z 0237:2000.

[Adhesive Force after Immersion in an Electrolytic Solution (B)]

A single-sided adhesive tape sample having a width of 10 mm was sticked to a SUS 304 plate polished by a water-resistant sandpaper of No. 280 as an index of roughness, reciprocating a 2.0 kg roller one time under pressure. After 20 minutes form the pressure sticking, the sample was immersed in an electrolytic solution by mixing ethylene carbonate and diethyl carbonate in a volume ratio of 1:1, followed by still standing in an environment with temperature of 40±5° C. for 24 hours. Thereafter, the sample was taken out from the vessel, the electrolytic solution was wiped by pure water and the water droplets were then wiped. Then, the sample was left in an environment of a temperature of 23±5° C. and humidity of 50±5% for 2 hours. Then, 180° peel adhesion (N/10 mm width) of this sample was measured according to the method described in JIS Z 0237:2000 and the measured value was taken as "adhesive force after immersion in the electrolytic solution".

[Adhesive Force Retention Rate after Immersion in the Electrolytic Solution (X)]

Adhesive force retention rate after immersion of the electrolytic solution (X) was calculated by the following formula:

$$X=[(B)/(A)]\times 100[\%]$$

[Weight-Average Molecular Weight]

Weight-average molecular weight (Mw) of an acrylic copolymer was obtained by a Gel Permeation Chromatography (GPC) method, as a standard polystyrene-equivalent molecular weight value of the acrylic copolymer using the following measuring device and conditions:

Measuring device: LC-2000 series (manufactured by JASCO Corporation)

Column: Two columns of Shodex KF-806M, one column of Shodex KF-802
Eluent: Tetrahydrofuran (THF)
Flow rate: 1.0 ml/min.
Column temperature: 40° C.
Injection amount: 100 μl
Detection device: Refractometer (RI)

[Piercing Strength]

A single-sided adhesive tape was sticked on a metal plate having a through hole with a circular cross-section shape of 5 mm diameter at a temperature of 23±5° C., so as to cover the through hole by the adhesive tape, and the adhesive tape was fixed by setting the adhesive tape between the metal plate and a jig having an O-ring. A needle having a half-circular cross-section shape with the radius of the top end of 0.5 mm was pierced through the adhesive tape from the side of the adhesive layer at a rate of 50 mm/min. The maximum stress was measured until the needle passed through the adhesive tape and the measured value was taken as the piercing strength.

Examples 1 to 8, Comparative Examples 1 to 13

(Preparation of Acrylic Copolymer)

Toluene, vinyl acetate and a chain transfer agent, as well as a radical polymerization initiator and the monomers described below to prepare an acrylic copolymer, in the amounts as parts by mass, shown in Table 1 were prepared in a reactor to which an agitator, a thermometer, a reflux condenser and a nitrogen introducing pipe were installed. After nitrogen gas was sealed in the reactor, the reaction was performed at 65° C. for 3 hours under nitrogen gas flow, while agitating. Thereafter, the radical polymerization initiator was added and the reaction was further performed at 75° C. for 3 hours. After the reaction was completed, the reaction mixture was cooled to the room temperature and 2-propanol was added thereto. An acrylic copolymer having solid content of 30% was obtained.

(i) acrylic monomer:
Component (A1)
  2-HEA: 2-hydroxethyl acrylate (A1a)
  4-HBA: 4-hydroxybutyl acrylate (A1b)
Component (A2)
  AA: Acrylic acid
Component (A3)
  MA: Methyl acrylate
Component (A4)
  BA: Butyl acrylate
  2-EHA: 2-ethylhexyl acrylate
(ii) Radical polymerization initiator
  Initiator type A: 2,2'-azobis-2-methylbutyronitorile (AMBN)
  Initiator type B: Dilauroyl peroxide (Product Name: Peroyl L, manufactured by NOF Corporation)
(iii) Chain transfer agent
  n-dodecanethiol (Preparation of Crosslinking Adhesive Composition)

The adhesive agents for Examples 1 to 4 and Comparative Examples 1 to 6, respectively, were prepared using the acrylic copolymers prepared by the above method under the condition that no crosslinking agent was added.

On the other hand, a crosslinking agent (E-5 XM, manufactured by Soken Chemical & Engineering Co. Ltd., solid content: 5%) was added to the acrylic copolymer prepared by the above method in the solid content amounts (parts by mass) shown in Tables 1 and 3 to 100 parts by mass of the acrylic copolymer, and the adhesive agents for Example 5 to 8 and Comparative Examples 7 to 13 were prepared, respectively.

(Production of Single-Sided Adhesive Tape)

Each of the adhesive agents prepared by the above method was applied evenly onto the whole surface on the one side of a polyimide file having a sickness of 25 μm, the both sides of which had been previously treated by corona discharge. The coated layer was dried by heating at 120° C. to form an adhesive layer of a thickness of 5 μm. A release paper of a long-chain alkyl type was sticked on the adhesive layer and, then the adhesive layer was cured at 40° C. for 3 days to obtain a one-sided adhesive tape having a total thickness of 30 μm.

(Evaluation of Adhesive Tape)

The evaluation results of the adhesive tape obtained in each of the examples and the comparative examples are shown in Tables 1 to 3.

TABLE 1

|  |  |  | Example ||||||||
|  |  |  | 1 | 2 | 3 | 4 | 5 | 6 | 7 | 8 |
|---|---|---|---|---|---|---|---|---|---|---|
| Adhesive agent compounding | Monomer composition [parts by mass] | 2-EHA | — | — | — | 60 | 60 | 60 | 60 | 60 |
|  |  | MA | 20 | 20 | 20 | 20 | 20 | 20 | 20 | 20 |
|  |  | BA | 50 | 50 | 60 | — | — | — | — | — |
|  |  | 2-HEA | 8 | 4 | 4 | 4 | 4 | 4 | 4 | 4 |
|  |  | 4-HBA | 12 | 6 | 6 | 6 | 6 | 6 | 6 | 6 |
|  |  | AA | 10 | 20 | 10 | 10 | 10 | 10 | 10 | 10 |
|  | Adhesive agent, Solid content [%] |  | 30 | 30 | 30 | 30 | 30 | 30 | 30 | 30 |
|  | Crosslinking agent, Added amount of solid content [parts by mass] |  | 0 | 0 | 0 | 0 | 0.002 | 0.083 | 0.167 | 0.50 |
| Initiator type |  |  | A | A | B | A | A | A | A | A |
| Weight-average molecular weight |  |  | *) | $41 \times 10^4$ | $52 \times 10^4$ | $50 \times 10^4$ | $50 \times 10^4$ | $50 \times 10^4$ | $50 \times 10^4$ | $50 \times 10^4$ |
| Evaluation results | Normal adhesive force (A) | [N/10 mm] | 1.3 | 2.2 | 1.4 | 1.6 | 1.4 | 1.3 | 1.4 | 1.1 |
|  | Adhesive force after immersion in electrolytic solution (B) | [N/10 mm] | 0.6 | 2.3 | 1.1 | 1.4 | 2.1 | 1.6 | 1.4 | 1.0 |

TABLE 1-continued

|  |  |  | Example | | | | | | | |
|---|---|---|---|---|---|---|---|---|---|---|
|  |  |  | 1 | 2 | 3 | 4 | 5 | 6 | 7 | 8 |
|  | Adhesive force retention rate after immersion in electrolytic solution (X) | [%] | 47 | 106 | 79 | 89 | 142 | 116 | 98 | 94 |
|  | Piercing strength | [N] | 18 | 18 | 18 | 18 | 17 | 19 | 18 | 18 |

*) Weight-average molecular weight could not be measured.

TABLE 2

|  |  |  | Comparative Example | | | | | |
|---|---|---|---|---|---|---|---|---|
|  |  |  | 1 | 2 | 3 | 4 | 5 | 6 |
| Adhesive agent compounding | Monomer composition [parts by mass] | 2-EHA | — | — | — | — | 70 | 70 |
|  |  | MA | 20 | 20 | 20 | 20 | 20 | 20 |
|  |  | BA | 66 | 64 | 70 | 70 | — | — |
|  |  | 2-HEA | 4 | — | 4 | — | — | 4 |
|  |  | 4-HBA | — | 6 | 6 | — | — | 6 |
|  |  | AA | 10 | 10 | — | 10 | 10 | — |
|  | Adhesive agent, Solid content [%] |  | 30 | 30 | 30 | 30 | 30 | 30 |
|  | Crosslinking agent, Added amount of solid content [parts by mass] |  | 0 | 0 | 0 | 0 | 0 | 0 |
| Initiator type |  |  | A | A | A | A | A | A |
| Weight-average molecular weight |  |  | $59 \times 10^4$ | $37 \times 10^4$ | $65 \times 10^4$ | $23 \times 10^4$ | $29 \times 10^4$ | $61 \times 10^4$ |
| Evaluation results | Normal adhesive force (A) | [N/10 mm] | 1.3 | 2.0 | 0.9 | 1.9 | 3.0 | 1.8 |
|  | Adhesive force after immersion in electrolytic solution (B) | [N/10 mm] | 0.4 | 0.8 | 0.0 | 0.0 | 0.9 | 0.1 |
|  | Adhesive force retention rate after immersion in electrolytic solution (X) | [%] | 34 | 42 | 0 | 0 | 30 | 3 |
|  | Piercing strength | [N] | 16 | 19 | 13 | 18 | 15 | 12 |

TABLE 3

|  |  |  | Comparative Example | | | | | | |
|---|---|---|---|---|---|---|---|---|---|
|  |  |  | 7 | 8 | 9 | 10 | 11 | 12 | 13 |
| Adhesive agent compounding | Monomer composition [parts by mass] | 2-EHA | 60 | — | — | — | — | — | — |
|  |  | MA | 20 | 20 | 20 | 20 | 20 | 20 | 20 |
|  |  | BA | — | 60 | 60 | 50 | 50 | 64 | 64 |
|  |  | 2-HEA | 4 | 4 | 4 | 4 | 4 | — | — |
|  |  | 4-HBA | 6 | 6 | 6 | 6 | 6 | 6 | 6 |
|  |  | AA | 10 | 10 | 10 | 20 | 20 | 10 | 10 |
|  | Adhesive agent, Solid content [%] |  | 30 | 30 | 30 | 30 | 30 | 30 | 30 |
|  | Crosslinking agent, Added amount of solid content [parts by mass] |  | 0.83 | 1.7 | 3.3 | 1.7 | 3.3 | 1.7 | 3.3 |
| Initiator type |  |  | A | A | A | A | A | A | A |
| Weight-average molecular weight |  |  | $50 \times 10^4$ | $78 \times 10^4$ | $78 \times 10^4$ | $41 \times 10^4$ | $41 \times 10^4$ | $37 \times 10^4$ | $37 \times 10^4$ |
| Evaluation results | Normal adhesive force (A) | [N/10 mm] | 0.9 | 0.7 | 0.4 | 0.5 | 0.1 | 0.6 | 0.3 |
|  | Adhesive force after immersion in electrolytic solution (B) | [N/10 mm] | 0.8 | 0.4 | 0.2 | 0.7 | 0.1 | 0.2 | 0.1 |
|  | Adhesive force retention rate after immersion in electrolytic solution (X) | [%] | 91 | 52 | 36 | 138 | 206 | 33 | 24 |
|  | Piercing strength | [N] | 19 | 16 | 16 | 18 | 18 | 16 | 17 |

In each of Examples 1 to 4 in Table 1, the acrylic copolymer of a self-crosslinking type containing no crosslinking agent was used as the resin component of the adhesive agent, wherein the monomer composition, i. e., monomer types and blending ratios, was suitably selected. As a result, although no crosslinking agent was added, the satisfactory and good results were obtained in each evaluation item. In particular, the adhesive tape could be obtained, which had the sufficient levels of the normal adhesive force, the adhesive force retention rate after immersion in the electrolytic solution and the piercing strength, in a good balance.

Although the weigh-average molecular weight could not be measured in Example 1, the adhesive tape could be produced smoothly without problems, and the satisfactory and good results in each evaluation item. It was considered that although the weigh-average molecular weight was greater than the measurable range, such point could not become a degradation factor against the inter-molecule crosslink structures. In contrast, in Comparative Examples 1 to 6, in each of which no crosslinking agents were added, but the monomer composition did not meet the definition according to the present invention, no adhesive tapes having the sufficient levels of both of the adhesive force retention rate and the piercing strength, in a good valance, could be obtained.

On the other hand, in each of Examples 5 to 8 in Table 1, the adhesive tape could be obtained by controlling the addition amount of the crosslinking agent in a small range, which had the satisfactory and good properties in each evaluation item, in a good valance, in particular, the sufficient levels of the normal adhesive force, the adhesive force retention rate after immersion in the electrolytic solution and the piercing strength.

As shown in Tables 1 and 3, the high normal adhesive forces could be kept by suppressing the addition mounts of the crosslinking component according to the monomer compositions of the present invention.

Regarding the results shown in Tables 1 to 3, it was revealed that the adhesive tapes were obtained, in which the addition amounts of the crosslinking agent were suppressed and further no crosslinking agent was added, while the adhesive tapes kept the sufficient properties in each evaluation item with a good balance.

INDUSTRIAL APPLICABILITY

The present invention can provide a crosslinking adhesive composition and an adhesive tape using the crosslinking adhesive composition, wherein the addition amount of a crosslinking agent is suppressed or, preferably, no crosslinking agent is added. The adhesive tape according the present invention is usable suitably in an environment in contact with an electrolytic solution of a non-aqueous battery, for example, in a battery, in particular, in a non-aqueous battery such as a lithium-ion secondary battery for insulation and fixing.

The invention claimed is:

1. A crosslinking adhesive composition, comprising an acrylic copolymer, having:
    more than 3 parts by mass and less than 25 parts by mass of component (A1) consisting of a hydroxyl group-containing (meth)acrylate monomer represented by chemical formula (1) and a hydroxyl group-containing (meth)acrylate monomer represented by chemical formula (2);
    more than 5 parts by mass and less than 25 parts by mass of component (A2) consisting of a carboxylic acid group-containing (meth)acrylate monomer;
    more than 5 parts by mass and less than 30 parts by mass of component (A3) consisting of a (meth)acrylic acid alkyl ester monomer represented by chemical formula (3); and
    more than 50 parts by mass and less than 90 parts by mass of component (A4) consisting of a (meth)acrylic acid alkyl ester monomer represented by chemical formula (4), based on 100 parts by mass consisting of a sum of components (A1) to (A4) wherein"

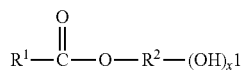

in the chemical formula (1):
$R^1$ represents $CH_2$=$CH$— or $CH_2$=$C(CH_3)$—;
$R^2$ represents a hydrocarbon group or an oxygen atom-containing hydrocarbon group; and
$x^1$ is an integer of 1 to 3;

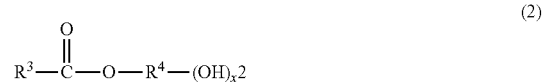

in the chemical formula (2);
$R^3$ represents $CH_2$=$CH$— or $CH_2$=$C(CH_3)$—;
$R^4$ represents a hydrocarbon group or an oxygen atom-containing hydrocarbon group, wherein a number of carbon atoms of $R^4$ is greater than that of $R^2$ in the chemical formula (1); and
$x^2$ is an integer of 1 to 3;

in the chemical formula (3);
$R^5$ represents $CH_2$=$CH$— or $CH_2$=$C(CH_3)$—; and
$R^6$ represents an alkyl group having 1 to 3 carbon atoms, a cyclohexyl group or an isobornyl group; and

in the chemical formula (4);
$R^7$ represents $CH_2$=$CH$— or $CH_2$=$C(CH_3)$—;
$R^8$ represents an alkyl group having 4 to 12 carbon atoms.

2. The crosslinking adhesive composition according to claim 1, wherein the composition is a self-crosslinking type containing no crosslinking agent.

3. The crosslinking adhesive composition according to claim 1, wherein the composition further comprises a crosslinking agent in an amount of 0.5 parts by mass or less, as a solid content, with respect to 100 parts by mass of the acrylic copolymer.

4. An adhesive tape comprising an adhesive layer, which comprises the crosslinking adhesive composition according to claim 1.

5. The adhesive tape according to claim 4, wherein the adhesive layer is formed on a base material.

6. The adhesive tape according to claim 5, wherein the base material is at least one selected from the group consisting of a polyethylene terephthalate (PET) film, a biaxially oriented polypropylene (OPP) film, a polyimide (PI) film and a polyphenylene sulfide (PPS) film.

7. The adhesive tape according to claim 4, wherein a thickness of the adhesive layer is from 1 μm to 200 μm.

8. The adhesive tape according to claim 4, wherein the adhesive tape has an adhesive force retention rate (X) of 45% or more than 45% after immersion in an electrolytic solution, which is calculated by the following calculation formula:

$$X=[(B)/(A)]\times 100[\%]$$

wherein X is a force retention rate after immersion in the electrolytic solution;
X is a force before immersion in the electrolytic solution; and
B is a force after immersion in the electrolytic solution.

9. A method for contacting a tape with an electrolytic solution in a non-aqueous battery, comprising:
contacting the adhesive tape according to claim 4 with the electrolytic solution in the non-aqueous battery.

* * * * *